(12) United States Patent
Zhou et al.

(10) Patent No.: US 12,422,730 B2
(45) Date of Patent: Sep. 23, 2025

(54) ELECTROMAGNETIC WAVE AND ENERGY STORAGE

(71) Applicants: York Zhiyuan Zhou, LaGrangeville, NY (US); Lucas Mingzhi Zhou, LaGrangeville, NY (US); Lin Zhou, LaGrangeville, NY (US)

(72) Inventors: York Zhiyuan Zhou, LaGrangeville, NY (US); Lucas Mingzhi Zhou, LaGrangeville, NY (US); Lin Zhou, LaGrangeville, NY (US)

( * ) Notice: Subject to any disclaimer, the term of this patent is extended or adjusted under 35 U.S.C. 154(b) by 534 days.

(21) Appl. No.: 17/984,550

(22) Filed: Nov. 10, 2022

(65) Prior Publication Data

US 2023/0155546 A1 May 18, 2023

Related U.S. Application Data

(60) Provisional application No. 63/279,077, filed on Nov. 13, 2021.

(51) Int. Cl.
| | | |
|---|---|---|
| *G02F 1/35* | (2006.01) |
| *F24S 23/00* | (2018.01) |
| *G02B 1/00* | (2006.01) |
| *G02B 3/00* | (2006.01) |
| *G02F 1/01* | (2006.01) |
| *H02S 40/22* | (2014.01) |

(52) U.S. Cl.
CPC ............ *G02F 1/3515* (2013.01); *F24S 23/00* (2018.05); *G02B 1/00* (2013.01); *G02B 3/0081* (2013.01); *G02F 1/0126* (2013.01); *H02S 40/22* (2014.12)

(58) Field of Classification Search
None
See application file for complete search history.

(56) References Cited

U.S. PATENT DOCUMENTS

| | | | | |
|---|---|---|---|---|
| 8,283,619 | B2 * | 10/2012 | Novack | H02S 99/00 |
| | | | | 250/208.2 |
| 2012/0019892 | A1 * | 1/2012 | Bowers | G02B 1/005 |
| | | | | 359/240 |

OTHER PUBLICATIONS

Edmund Optics, Inc., "Laser Beam Expanders", https://www.edmundoptics.com/knowledge-center/application-notes/lasers/beam-expanders/#, Accessed on Nov. 9, 2022, 6 pages.
Hau, L.V., et al., "Light speed reduction to 17 metres per second in an ultracold atomic gas", Nature, Feb. 18, 1999, pp. 594-598, vol. 397.
Liu, C., et al., "Observation of coherent optical information storage in an atomicmediumusing halted light pulses", Nature, Jan. 25, 2001, pp. 490-493, vol. 409.

* cited by examiner

*Primary Examiner* — Dung T Nguyen
(74) *Attorney, Agent, or Firm* — Scully, Scott, Murphy & Presser, P.C.

(57) ABSTRACT

Almost all energy on Earth comes from the Sun. It radiates power to Earth using electromagnetic (EM) waves. However, only a small fraction of the radiation was captured in the forms of photovoltaic, solar heat, hydropower, fossil fuel, and wind. The consumption of the energy comes with serious environmental penalties such as global warming and environmental damages. A system and methods are disclosed to allow capturing, storage, conversion and release of electromagnetic waves and their energy.

20 Claims, 4 Drawing Sheets

ELECTROMAGNETIC WAVE AND ENERGY STORAGE

CROSS-REFERENCE TO RELATED APPLICATIONS

The present application claims the benefit of and priority to U.S. Provisional Patent Application Ser. No. 63/279,077, filed on 13 Nov. 2021, the entirety of which is incorporated by reference herein.

BACKGROUND OF THE INVENTION

Since the beginning of humankind, we have been in a race for energy. A million years ago, our ancestors made fires to keep warm. Today, we use electricity to power homes and businesses around the world. Almost all energy on Earth comes from the Sun. It radiates energy to Earth using electromagnetic (EM) waves. However, only a small fraction of the radiation was captured in the forms of photovoltaic, solar heat, hydropower, fossil fuel, and wind. The consumption of the energy comes with serious environmental penalties such as global warming and environmental damages. A breakthrough technology is urgently needed to directly capture the radiation energy from the universe at high efficiency and sustainability, i.e. renewable, clean, portable, safe, and high energy density. A system is disclosed for capturing energy from electromagnetic waves. The system modulates the group reflective index of the electromagnetic wave to control the group velocity of the waves. Light is a form of electromagnetic wave. This allows the system to capture and store electromagnetic waves and their energy in its medium. The system can also convert the electromagnetic waves into other energy forms such as electricity and heat.

SUMMARY OF THE INVENTION

The systems and methods described herein provide ways to capture, store, convert, and release electromagnetic energy. In an aspect of the present disclosure, a system for processing electromagnetic waves is disclosed. The system comprises: a collector housed in a chamber, the collector for receiving electromagnetic waves and focusing said electromagnetic waves toward a medium housed in the chamber for propagation within said medium; a modifier device operatively connected to the medium for programming the refractive index value of the medium. The system further comprises: a controller running programmed instructions for configuring the modifier device to change the refractive index of the medium to a value for changing the speed of the electromagnetic waves to a predetermined value; and a conductor coupled to the medium housed in the chamber, the conductor configured to receive the electromagnetic waves exiting from the medium and to transport the electromagnetic waves to a location for a consumption thereof.

In an embodiment, the speed of the electromagnetic waves is changed to a predetermined value for storing the electromagnetic waves in the medium for a predetermined amount of time.

In an aspect of the present disclosure, a method is disclosed for capturing, storing and releasing electromagnetic waves. The method comprises: receiving, at a collector device housed within a chamber, electromagnetic waves, and focusing, by the collector device, said received electromagnetic waves toward a medium housed in the chamber for propagation within said medium; programming, using a modifier device operatively connected to the medium, the refractive index value of the medium for changing the speed of the electromagnetic waves propagating inside the medium to a predetermined value for storing said electromagnetic waves inside the medium for a predetermined amount of time; and receiving, at a conductor physically coupled to the medium, the electromagnetic waves exiting from the medium, and transporting the electromagnetic waves to a location for consumption thereof.

Further features as well as the structure and operation of various embodiments are described in detail below with reference to the accompanying drawings. In the drawings, like reference numbers indicate identical or functionally similar elements.

DETAILED DESCRIPTION OF THE INVENTION

The systems and methods described herein may capture, store, and release electromagnetic waves. The systems and methods described herein may also convert the electromagnetic waves into other energy forms, and output an energy for consumption.

Figure 1:
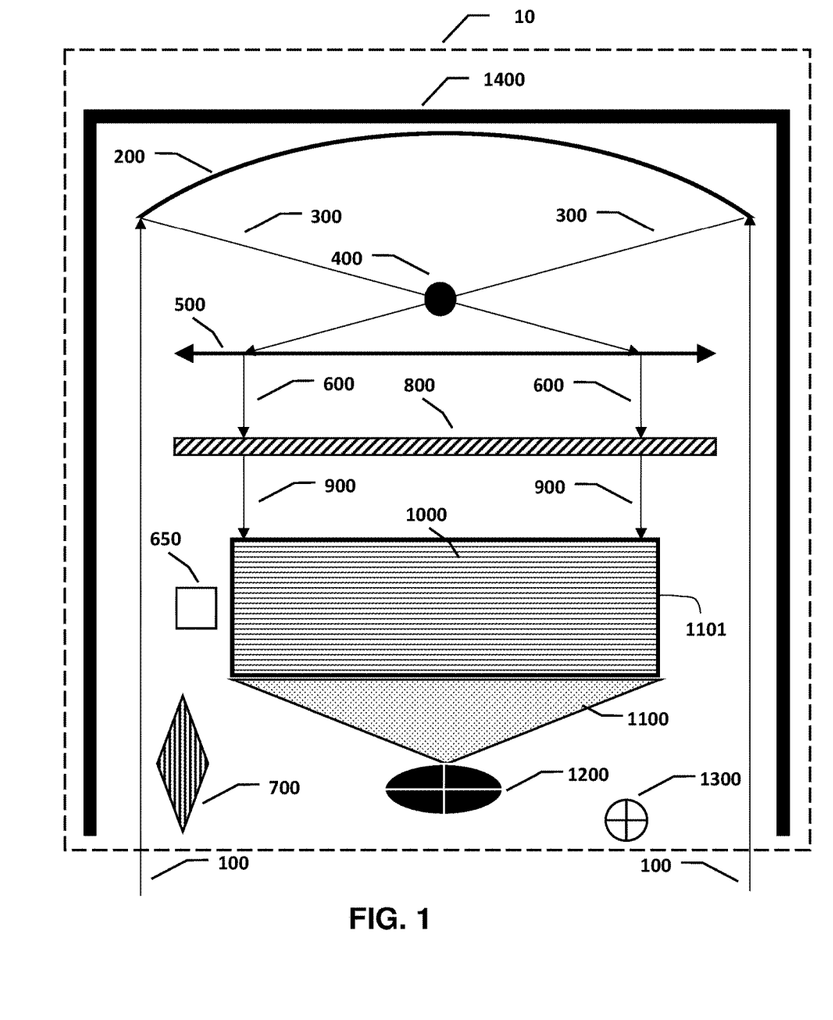
FIG. 1 is an overview of a system.

Referring now to FIG. 1, a system 10 is disclosed. System 10 may include, for example, a collector 200, a lens 500, a modifier 650, a controller 700, a filter 800, a medium 1000, a container 1101, a conductor 1100, a converter 1200, a power supply 1300, and a chamber 1400.

The universe is filled with electromagnetic waves. The wave consists of an electric component and a magnetic component, which oscillate at a frequency f in directions orthogonal to each other. The electromagnetic wave travels in a direction perpendicular to the oscillation directions of the electric and magnetic components. A light is an electromagnetic wave. The light visible to human eyes has a frequency range from $390 \times 10^{12}$ Hz to $770 \times 10^{12}$ Hz approximately. The energy of a photon is hf, where h is the plank constant $6.626 \times 10^{-34}$ J/Hz. The Sun is a major source of the electromagnetic wave to the Earth.

The refractive index of a medium is n. The refractive index of the vacuum is 1. The air on the Earth has a refractive index of 1 approximately. The speed of the electromagnetic wave in the vacuum is c, $3 \times 10^8$ m/s. When the electromagnetic wave is incident on a medium's surface, a portion of the wave is reflected while the rest of the wave enters the medium and gets refracted. When the electromagnetic wave enters the medium from the vacuum, its velocity is affected by n. There are two types of velocity in the medium.

For the electromagnetic wave with a frequency of f, its phase velocity is $v_p = c/n(\omega)$, where $\omega = 2\pi f$, $\omega$ is an angular frequency, and $n(\omega)$ is the refractive index for the electromagnetic wave at an angular frequency of $\omega$. The higher the n value is, the slower the phase velocity in the medium is.

For a group of electromagnetic waves at different frequencies, the group velocity is $v_g = c/n_g$ and $n_g = n(\omega) + \omega * \partial n$ $\partial n(\omega)/\partial \omega$, where $\partial n(\omega)/\partial \omega$ is the partial derivative of $n(\omega)$ with respect to $\omega$, and $n_g$ is the group refractive index. It indicates the larger $\partial n(\omega)/\partial \omega$ is, the slower the group velocity is. The group velocity carries energy and information. If the dispersion relation of the refractive index is such that the index changes rapidly over a small range of frequencies, then the group refractive index would be very large. As a result, the group velocity can be very slow so that the electromagnetic wave would stay inside the medium for an extended period of time.

In the case of electromagnetic waves consisting of only one frequency, $\partial n(\omega)/\partial \omega = 0$, therefore, $v_g = v_p$, i.e. the group velocity is the same as the phase velocity.

The system 10 may leverage material dispersion, spatial dispersion, and waveguide dispersion technologies to create large values of $\omega * \partial n(\omega)/\partial \omega$ for increasing $n_g$ to slow down or stop the electromagnetic wave. In essence, the system can store electromagnetic wave and its energy and information.

Electromagnetically induced transparency (EIH) is a material dispersion technology. It is based on quantum interference phenomena. One example embodiment involves high-density atom clouds such as sodium atoms, with a density of about $10^{11}$ cm$^{-3}$ that are cooled down to a temperature of micro-Kelvin to nano-Kelvin, which is about the critical transition temperature for Bose-Einstein condensation. In this state, quantum phenomena such as wave interference become apparent. Three quantum states are directly involved: ground states |a> and |c>, and an upper state |b>. A laser beam (coupling laser) is directed to the cloud and has an angular frequency $\omega_c$ tuned to the energy gap between |b> and |c>. $\omega_c = 2\pi(E_b - E_c)/h$, where $E_b$ and $E_c$ are the energy levels of states |b> and |c> respectively. The energy gap between |b> and |a> determines the central angular frequency $\omega_p$ of the energy-carry electromagnetic wave which is being captured for storage. $\omega_p = 2\pi(E_b - E_a)/h$, where $E_a$ is the energy level of state |a>. In the case that the D2 line of the sodium atom is involved in the quantum interference, $\omega_p$ is about $5.1 \times 10^4$ Hz while $\omega_c$ is about $1.8 \times 10^9$ Hz lower than $\omega_p$. The coupling laser beam induces a quantum interference such that the state of the atom is the superposition of states |a> and |c>. The group refractive index $n_g$ is therefore highly sensitive to the change in $\omega_p$. $n_g \approx 2\omega_p N |\mu_{ba}|^2/(\hbar c \varepsilon_o |\Omega_c|^2)$ where $\varepsilon_o$ is the permittivity of the vacuum, N is the atomic density, $\hbar = h/(2\pi)$, $\mu_{ba}$ is the electric dipole matrix element between states |b> and |a>, and $\Omega_c$ is the Rabi frequency of the coupling laser. This allows the laser beam to control the propagation of the energy-carrying electromagnetic wave inside the gas cloud. The energy density of the coupling laser beam could be adjusted to a range of values by the controller, e.g. about 12 mW/cm$^2$ in one example embodiment which is corresponding to a Rabi frequency $\Omega_c$ of about 0.56 A, where A is the Einstein coefficient $6.3 \times 10^7$ rad/s. In this example embodiment of system 10, the atom-clouds is the medium 1000.

In the example embodiment of the system 10, a couple laser with a frequency of $\omega_c$ is directed to the medium made of the sodium cloud. This allows the refractive index of the medium 1000 to be increased for an electromagnetic wave with a frequency of $\omega_p$ so as to slow down the speed of the electromagnetic wave. The electromagnetic wave is kept in the medium for a longer time. The system 10 also allows the refractive index of the medium 1000 to be reduced for increasing the speed of the electromagnetic wave so as to release the EM wave from the medium. For example, when the coupling laser is turned off, the refractive index of the medium 1000 returns to a small value. As a result, the electromagnetic wave in the medium is sped up and is released from the medium quickly.

The refractive index of the medium can be adjusted using a variety of techniques. They include by not limit to electromagnetically induced transparency, coherent population oscillation, various four-wave mixing schemes. They also include by not limit to waveguide dispersion mechanisms such as photonic crystals, coupled resonator optical waveguides, and other macro-resonator structures. They further include by not limit to exploiting spatial dispersion properties of planar waveguides realized with single negative metamaterials or double negative metamaterials.

The collector 200 is used to reflect and focus the electromagnetic wave 100. The collector consists of a round rigid base which is made of a metal such as aluminum, or a no-metal material such as glass. On the base, a single layer or multi-layer coating is applied to achieve a high reflectivity to the electromagnetic wave. The collector is curved into a concave shape so as to focus the electromagnetic wave to a focal point 400. One example of the collector is a concave mirror that consists of a glass base of about 1 cm thick, and an aluminum coating of about 100 nm thick, or multi layers of silicon dioxide and silicon nitrides, each about a 10,000th of an inch thick. When the electromagnetic wave, e.g. the visible portion of it, is incident on the collector, it gets reflected. The size of the collector depends on applications. In an embodiment, the collector has a diameter of 1 cm to 5 meters. A smaller collector makes the system more portable. In a non-limiting embodiment, the focal length is 1 mm to 5 meters.

The reflected electromagnetic wave 300 is focused to the focal point which is at a distance of a focal length away from the collector, and the areal energy density of the electromagnetic wave is increased.

After passing the focal point, the electromagnetic wave diverges while propagates towards the lens 500. The lens is used to change the shape of the diverged wave into parallel waves. The lens is of a focus type and made of materials that has a low reflectivity to the electromagnetic wave. An example lens is a round focus lens made of glass with or without an antireflective coating. The lens is placed at a location such that its focal point is on or at the vicinity of the focal point 400 of the collector. The radius of the lens depends on applications, and in a non-limiting embodiment, is 1 cm to 5 meters. The focal length of the mirror depends on applications, and in a non-limiting embodiment, is 1 mm to 3 meters.

The filter 800 allows the electromagnetic wave at selected frequencies to pass through while blocking the electromagnetic wave at other frequencies. It can be a low-pass filter, a high-pass filter, or a band-pass filter. In embodiments, it is constructed in the form of a waveguide, or constructed in the form of a substrate with a coating on the surface for selecting the passing frequency. An example filter is a green film which only allows the electromagnetic wave with a frequency of about $545 \times 10^{12}$ Hz to pass. An example filter of the waveguide type is an optical fiber which allows electromagnetic waves with a wavelength, e.g. 850 nm, to pass. The size of the filter depends on applications. For a round-shaped optical fiber, its diameter is 0.1 mm to 1 cm. The filter is configured by the controller 700 which comprises a microprocessor, central processing unit (CPU), application-specific integrated circuit (ASIC), or like processor device. In an example embodiment, the filter comprises a plurality of optical fibers. Each fiber can carry the electromagnetic wave in a specific frequency range while attenuates electromagnetic waves in other frequency ranges. The controller configures the filter such that the electromagnetic wave is directed to the fiber that allows the electromagnetic wave at the desirable frequency to pass.

The conductor 1100 is used to transport the electromagnetic wave to a desired location with a negligible loss. The conductor is in the form of a waveguide. An example conductor is a hollow conductive metal pipe that carries high frequency electromagnetic waves. The shape and size of the conductor depend on applications. For example, it can be square, round, oval, or other shapes. For a round-shaped conductor, its diameter is 1 cm to 5 meters. The conductor is placed abutting the surface of the medium where the electromagnetic wave exists. Depends on the location that the electromagnetic wave needs to be transported to, the conductor can be rigid or bendable.

The EM wave released from the system 10 can be converted into other forms of energy such as electricity, heat, kinetic energy, and potential energy, using a converter 1200. An example converter is a solar panel which converts the electromagnetic wave to electricity.

The system 10 is powered by a power supply 1300. The system, in non-limiting embodiments can use electricity that can be a direct current (DC) or alternating current (AC) types. The voltage of the power supply is typically between 3.3 V and 500 V.

The components of the system 10 is placed inside a chamber 1400. The chamber is made of rigid materials, e.g. steel or plastic. The chamber protects the system 10. The chamber comprises a pump to set an ambient pressure within the chamber, a heating unit and a cooling unit to set a temperature within the chamber, a dehumidifier and humidifier to set a humidity level within the chamber, and a fan to set air flow rate within the chamber. Inside the chamber, the environment parameters, including temperature, humidity, pressure, and air flow, are configured by the controller 700 for the capture, storage, and release of the electromagnetic wave. The shape and size of the chamber depend on applications. For example, it can be square, round, oval, or other shapes. For a round-shaped chamber, its diameter can range anywhere from between 1 cm to 5 meters.

Figure 2:
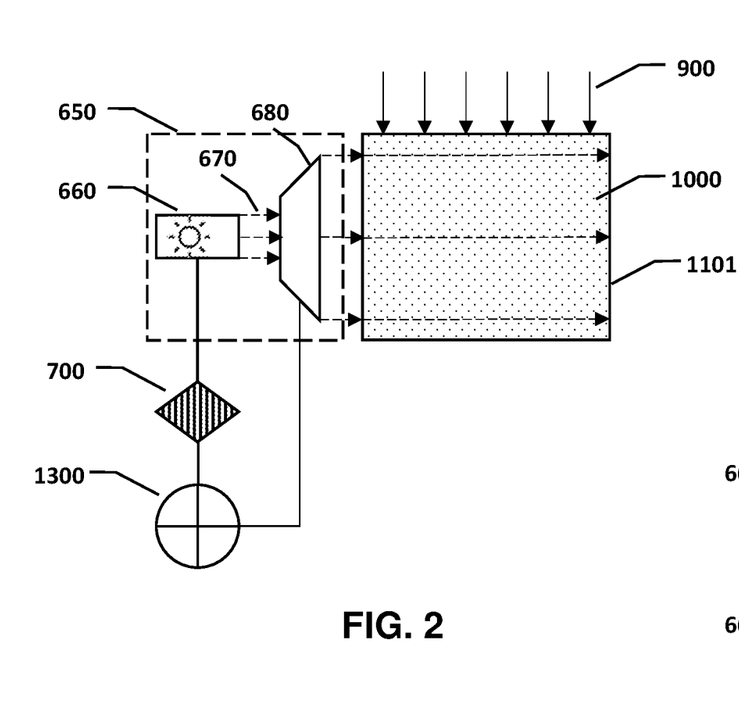
FIG. 2 shows a portion of the system that illustrates a power supply, a controller, a modifier, and a medium.

FIG. 2. shows a subsection of an example embodiment of system 10 that uses EIH to modify the speed of the electromagnetic wave. The power supplier 1300 powers the controller 700 and the modifier 650. The modifier comprises a laser selector 660 for selecting a laser beam type from a laser source, and a laser beam expander 680. Item 670 represents a laser beam from the laser selector.

Figure 3:
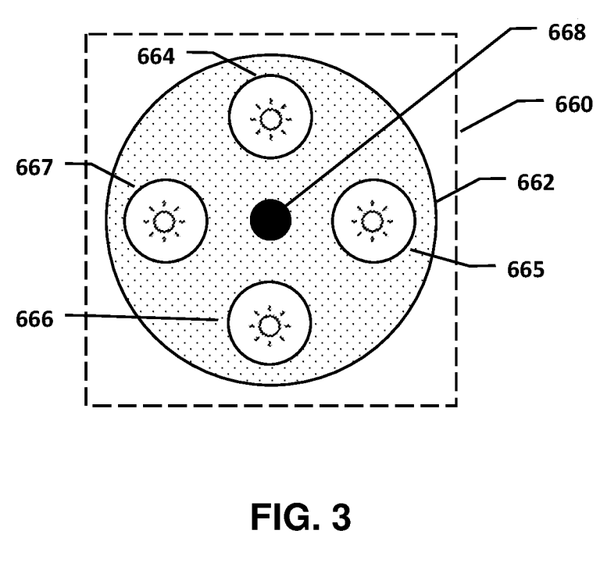
FIG. 3 illustrates a laser selection system.

FIG. 3 shows a cross section view of the laser selector 660 comprising a plurality of laser sources 664, 665, 666, and 667 although more or fewer laser sources can be incorporated in the laser selector. The laser sources are mounted inside bore-holes in a disc 662. Each of the laser source is configured to emit a laser beam at a specific wavelength for being used as the coupling laser for change the speed of the electromagnetic wave. The disc is mounted on a motor 668 such that the laser sources can be rotated under the control of the controller. When a laser source is rotated to a predetermined position, e.g., the 12 o'clock position, the laser source is powered on under the control of the controller. In the other positions, the laser source is turned off under the control of the controller. The radius of the bore-holes depends on the application and in a non-limiting embodiment, can range anywhere from between 1 cm to 20 cm. The radius of the disc depends on applications and in a non-limiting embodiment, can range anywhere from between 5 cm to 1 m. The thickness of the disc depends on applications and in a non-limiting embodiment, can range anywhere from between 5 cm to 20 cm. The disc can be made of a variety of rigid materials including, but not limited to, plastic and ceramic material.

The beam expander 680 can be configured by the controller 700. The expander receives the laser 670 from the beam selector, increases the diameter of the laser beam, and outputs the laser beam with a larger diameter. The ratio between the diameters of the output beam and the input beam is the magnification. The output laser beam is directed to the medium. In the example embodiment, a Keplerian expander or a Galilean expander can be used. The Keplerian expander is a laser beam expander including two focus lenses separated by the sum of their focal lengths. The Galilean expander is a laser beam expander including an objective lens of the diverging type and an imagine lens of the focus type which are separated by the sum of their focal lengths. The magnification of a Galilean expander or a Keplerian expander equals to the focal length of the output lens divided by the focal length of the input lens. The magnification can be anywhere between 1 to multiple of thousands. The diameter of the output laser beam is comparable to the dimension of the medium 1000. The medium's size depends on application. In a non-limiting embodiment, the medium therein is of a length, width, or height ranging from anywhere between 1 mm to 1 m. The medium may be housed in a container 1101 that is transparent to the laser 670. The container can be made of variety of materials with glass or quartz being more typically. In the embodiment depicted, the selected, expanded laser beam is input to the medium 1000 through the transparent container 1101 in a direction transverse or orthogonal to a direction of the electromagnetic waves 900 propagating inside said medium.

Figure 4:
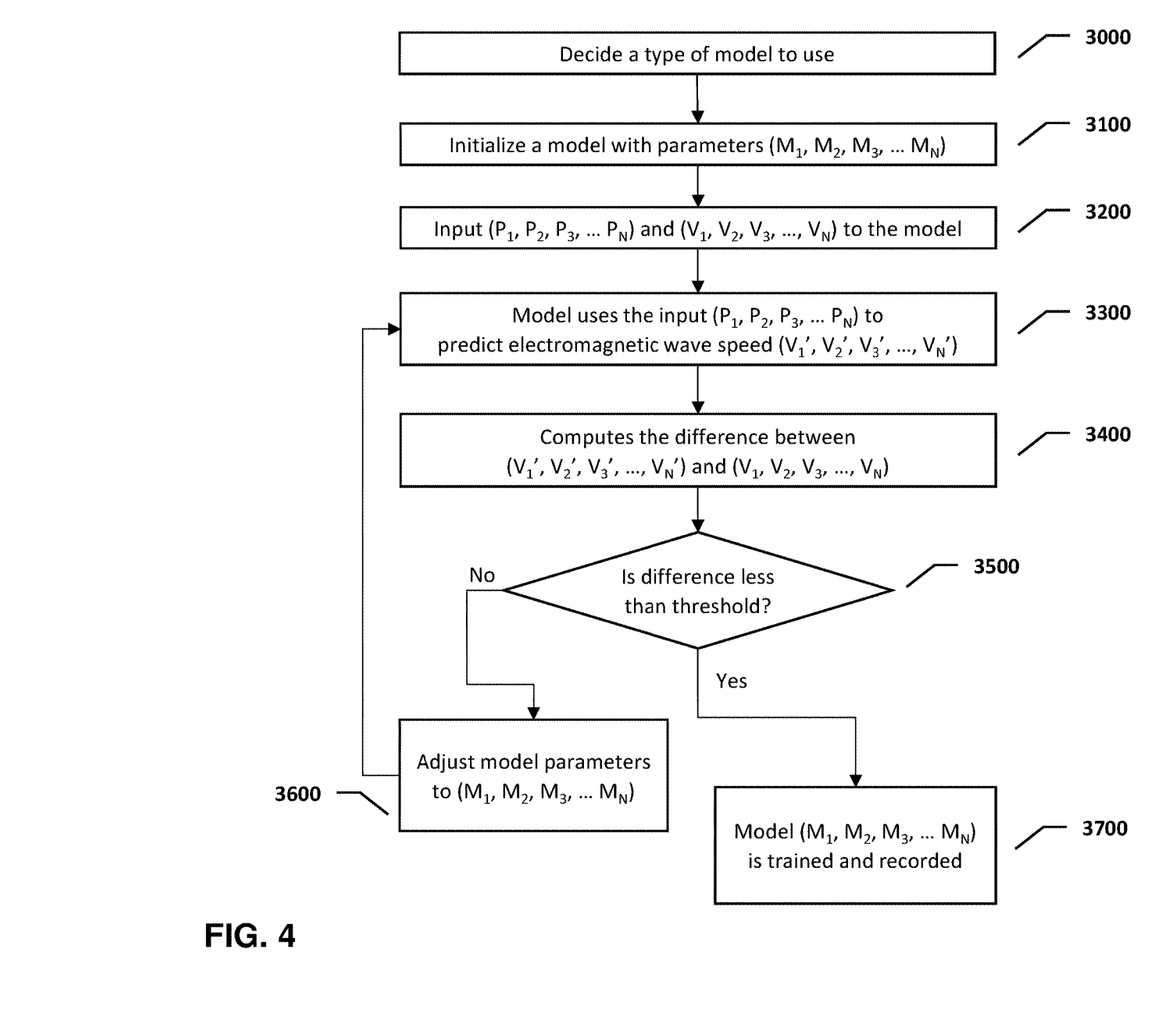
FIG. 4 is a flow chat illustrating an example model training process in accordance with an aspect of the present disclosure.

The speed of the electromagnetic wave depends on the refractive index of the medium. The refractive index of the medium is affected by a variety of operating condition parameters including the frequency of the coupling laser, the frequency of the electromagnetic wave, the power of the coupling laser, and the properties of the medium. The refractive index of the medium is further affected by the operating condition parameters of an ambient environment including temperature, humidity, pressure, and air flow inside the chamber 1400. The relationship between the resultant electromagnetic wave speed and the parameters is modeled in an electromagnetically induced transparency model. In particular, in an off-line process, an electromagnetically induced transparency model is developed and trained to model the relationship between a desired electromagnetic wave speed propagating within the particular medium in response to corresponding operating condition parameters of the medium, the coupling laser beam, and the ambient environmental conditions inside said chamber. In an embodiment, the propagating speed of the desired electromagnetic wave correlates to an amount of storage time it is desired to store the propagating electromagnetic wave. To develop the model, the following process is used. A set of parameters $P_1$ are identified, recorded, and used to set the modifier, medium, and the ambient environment. The resultant speed $V_1$ of the electromagnetic wave is measured and recorded. The second set of parameters $P_2$ are identified, recorded, and used to set the modifier, medium, and the ambient environment. The resultant speed of the electromagnetic wave $V_2$ is measured and recorded. The same procedure is repeated until the Nth data set $P_N$ and $V_N$ are recorded. $(V_1, V_2, V_3, \ldots, V_N)$ collectively covers the range of electromagnetic wave speed, and $(P_1, P_2, P_3, \ldots P_N)$ collectively covers the corresponding range of operating condition. $(P_1, P_2, P_3, \ldots P_N)$ and $(V_1, V_2, V_3, \ldots, V_N)$ are the training date set for developing the electromagnetically induced transparency model. A variety of machine learning methods can be used to develop the model. They include decision tree, logistic regression, linear regression, supported vector machine, neural network, and deep neural network. During the training process, the model parameters are adjusted iteratively, using method such as a gradient descent method. The goal of the training is to produce a model such that the predicted speeds by the model, based on the input parameters ($P_1, P_2, P_3, \ldots P_N$), is closely matched with the corresponding expected speeds ($V_1, V_2, V_3, \ldots, V_N$). FIG. 4 is a flow chart illustrating an example process of training a model. A person who trains the model (trainer) decides a type of model suitable for a system (process 3000). The model type includes but is not limiting to decision tree, logistic regression, linear regression, supported vector machine, neural network, and deep neural network models. Using a computer, the trainer makes an initial guess of the model parameters ($M_1, M_2, M_3, \ldots, M_N$) and initializes the model (process 3100). The trainer inputs ($P_1, P_2, P_3, \ldots P_N$) and ($V_1, V_2, V_3, \ldots, V_N$) to the model (process 3200). Based on the input ($P_1, P_2, P_3, \ldots P_N$), the model predicts an electromagnetic wave speed set ($V_1', V_2', V_3', \ldots, V_N'$) (process 3300). The difference between the expected speed ($V_1, V_2, V_3, \ldots, V_N$) and predicted speed ($V_1', V_2', V_3', \ldots, V_N'$) is computed (process 3400), which could be based on a group of algorithms such as a least square algorithm and a weighted least square algorithm. The difference is compared with a pre-defined threshold value (process 3500). If the difference is less than the threshold value, the model is trained for future uses and the model parameter ($M_1, M_2, M_3, \ldots, M_N$) are recorded (process 3700). If the difference is greater than the threshold value, the model parameters are adjusted using algorithms such as a gradient descent algorithm (process 3600). The newly adjust model parameter is then used to re-predict the electromagnetic wave speed (process 3300). The training process could iterate many cycles until a good model is trained.

When the electromagnetic wave's speed needs to be changed to $V_o$, or alternatively, when it is desired to change an amount time desired to store the propagating electromagnetic wave in the medium, the controller uses the electromagnetically induced transparency model to determine the corresponding operating condition parameters. The controller uses those parameters to configure the modifier, medium, and the ambient environment inside the chamber.

Figure 5:
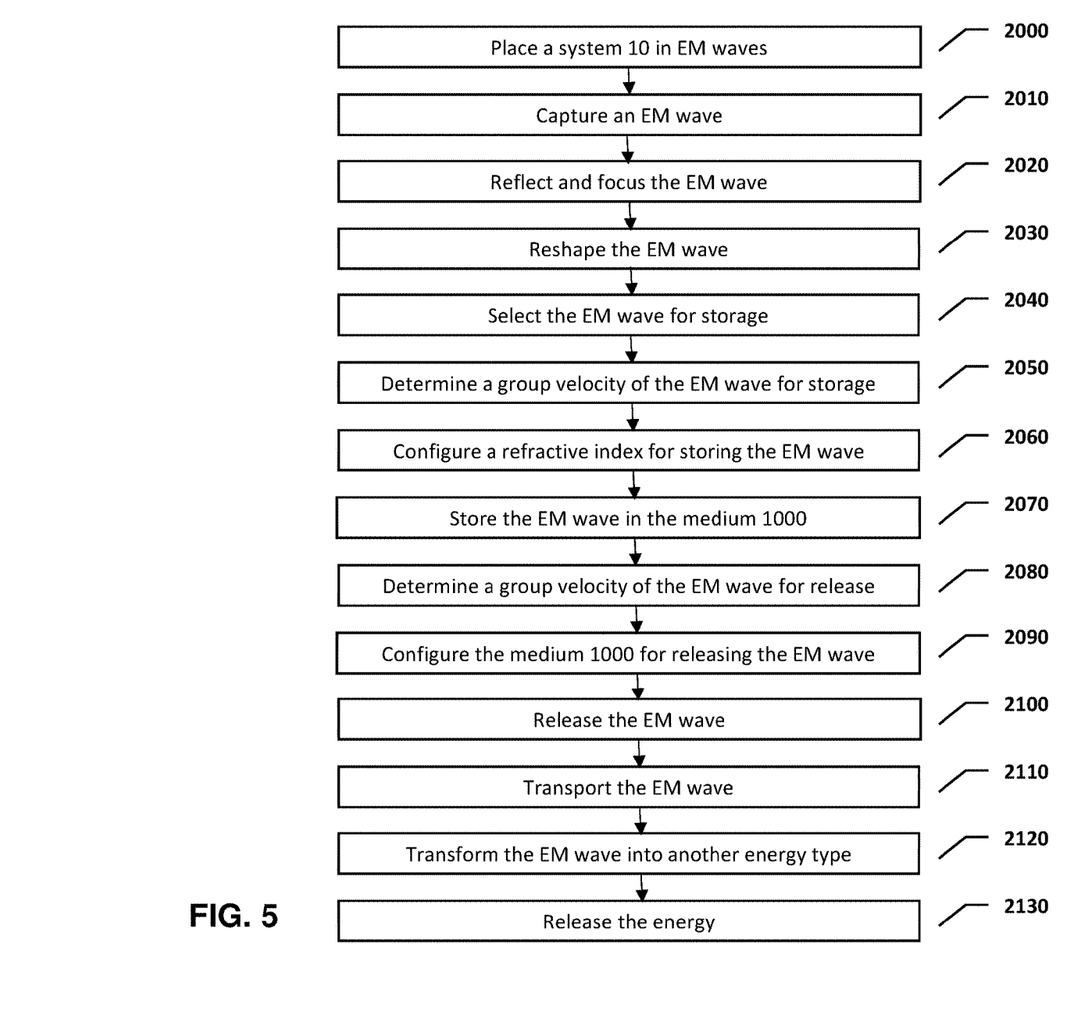
FIG. 5 is a flow chat illustrating an example method in accordance with an aspect of the present disclosure.

FIG. 5 is a flow chart illustrating an example method of capturing, storing, releasing electromagnetic waves and energy. A system 10 is place in electromagnetic waves (process 2000). Through the opening of the chamber 1400, the electromagnetic waves 100 enter the chamber (process 2010). The electromagnetic wave is incident on the collector 200, reflected, and focused to the focal point 400 (process 2020). The lens 500 is placed at a location such that its focal point is on or at the vicinity of the focal point 400 of the collector. As a result, the diverged electromagnetic wave is reshaped into a parallel wave 600 (process 2030). The filter 800 only allows the electromagnetic waves at selected frequencies to pass (process 2040). A subset of the electromagnetic wave that passes the filter is the waves 900 that propagate through the medium 1000 in a predetermined direction.

The medium 1000 has a thickness of $d_o$. In order to storage the electromagnetic wave in the medium for a period of time $t_o$, the group velocity of the wave $v_g$ can be determined as $v_g = d_o/t_o$ (process 2050). For example, a medium with a thickness of 1 mm would need the group velocity to be about $3.17 \times 10^{-11}$ m/s in order to store the electromagnetic wave for 1 years.

In process 2060, the medium's group refractive index $n_g$ is determined. $n_g = c/v_g$. Continue with the previous example, $n_g$ is about $9.46 \times 10^{18}$. Also, in process 2060, the controller 700 adjusts the medium's refractive index based on an electromagnetically induced transparency model.

The electromagnetic wave is slowed down and kept in the medium for the period of time $t_o$ (process 2070).

If the electromagnetic wave needs to be released from the medium in time t'. The magnetic wave can be speed up to a new group velocity $v_g'$. Assuming the electromagnetic wave still has a distance of d' to travel before exiting the medium, $v_g' = d'/t'$ (process 2080).

In process 2090, the medium's group refractive index $n_g'$ is determined. $n_g' = c/v_g'$. Also, in process 2090, the controller 700 adjusts the medium's refractive index to $n_g'$ based on an electromagnetically induced transparency model.

Propagating at the new group velocity $v_g'$, the electromagnetic wave is released from the medium (process 2100).

Upon existing the medium, the electromagnetic wave may enter the conductor. The conductor is configured to transport the wave to a desirable location (process 2110).

The electromagnetic wave may be transported to a converter 1200, for converting to another energy form (process 2120). For example, a photovoltaic panel may be used to as the converter to convert the electromagnetic wave into electricity. The energy in the new form is released from the converter for consumption (process 2130).

The electromagnetic wave does not have to be converted to other forms of energy before it can be consumed. In the case of cancer treatment using a gamma knife radiosurgery machine, the controller 700 can configure the system 10 to capture the electromagnetic wave in a gamma ray frequency of approximately $10^{19}$ Hz or above. During the treatment session, the controller 10 configures the system 10 to release the gamma ray from the medium 1000, and direct the gamma ray to the cancer site without having to use the convertor 1200.

In the case of using the system 10 for illumination during the night, the controller 700 can configure the system 10 to capture the electromagnetic wave in a visible light wavelength range of approximately 400-700 nm. During the night when it gets dark, the controller 700 configures the system 10 to release the visible light from the medium 1000 to illuminate a site.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system for processing electromagnetic waves comprising:
   a collector housed in a chamber, the collector for receiving electromagnetic waves and focusing said electromagnetic waves toward a medium housed in the chamber for propagation within said medium;
   a modifier device operatively connected to the medium for programming the refractive index value of the medium;
   a controller running programmed instructions for configuring the modifier device to change the refractive index of the medium to a value for changing the speed of the electromagnetic waves to a predetermined value; and
   a conductor coupled to the medium housed in the chamber, the conductor is configured to receive the electromagnetic waves exiting from the medium and to transport the electromagnetic waves to a location for a consumption thereof.

2. The system as claimed in claim 1, wherein the speed of the electromagnetic waves is changed to a predetermined value for storing the electromagnetic waves in the medium for a predetermined amount of time.

3. The system as claimed in claim 2, further comprising:
   a convertor device connected to the conductor for receiving electromagnetic waves exiting from the medium, the converter device configured to convert the electromagnetic waves to another energy type selected from the group comprising: electricity, heat, kinetic energy, and potential energy.

4. The system as claimed in claim 1, further comprising:
   a filter located between said collector and said medium in the chamber, the filter configured to allow electromagnetic waves at selected frequencies to pass through.

5. The system as claimed in claim 4, further comprising:
   a lens situated between the collector and said filter, the lens configured to change the electromagnetic waves to parallel waves for input to said medium.

6. The system of claim 1, wherein said modifier device comprises:
   a laser selector device for selecting a laser source for emitting a selected laser beam for input to said medium for programming the refractive index value of the medium to a value sufficient to store the electromagnetic waves inside the medium; and
   a laser beam expander for expanding the selected laser beam input to said medium.

7. The system of claim 6, wherein said expanded selected laser beam is input to said medium in a direction transverse to a direction of said electromagnetic waves propagating inside said medium.

8. The system as claimed in claim 6, wherein said laser beam expander receives said emitted laser beam of a selected laser source and expands a diameter of the selected laser beam input to said medium.

9. The system of claim 1, wherein said laser selector device comprises:
   plural laser sources, each said laser source is mounted in a rotatable disc.

10. The system of claim 9, wherein each laser source is mounted inside a respective bore-hole, the respective boreholes located spaced apart within the rotatable disc.

11. The system of claim 9, wherein said controller is operable to activate a laser source to emit the coupling laser beam at the specific wavelength and power level in a direction of the medium when said disc is rotated to a pre-determined position.

12. The system as claimed in claim 11, wherein the expander is one of: a Keplerian expander or a Galilean expander.

13. The system as claimed in claim 1, wherein the controller device is further configured to control an environmental parameter in the chamber, the environmental parameter comprising one or more of: a temperature, a humidity, a pressure, and an air flow rate within the chamber, said parameters configured by the controller for operatively capturing the electromagnetic waves, storing the electromagnetic waves, and releasing the electromagnetic waves from said medium.

14. A method of processing electromagnetic waves, the method comprising:
   receiving, at a collector device housed within a chamber, electromagnetic waves, and focusing, by the collector device, said received electromagnetic waves toward a medium housed in the chamber for propagation within said medium;
   programming, using a modifier device operatively connected to the medium, the refractive index value of the medium for changing the speed of the electromagnetic waves propagating inside the medium to a predetermined value for storing said electromagnetic waves inside the medium for a predetermined amount of time; and
   receiving, at a conductor physically coupled to the medium, the electromagnetic waves exiting from the medium, and transporting the electromagnetic waves to a location for consumption thereof.

15. The method as claimed in claim 14, wherein said focusing of said received electromagnetic waves toward a medium housed in the chamber further comprises:
   filtering the electromagnetic waves so only those waves at selected frequencies can propagate through;
   changing, using a lens, the electromagnetic waves to parallel waves by placing a lens with its focal point on or at the vicinity of the location where the electromagnetic waves are focused to.

16. The method as claimed in claim 15, wherein a refractive index value of the medium for changing the speed of the electromagnetic waves propagating inside the medium is computed by:
   determining a duration for storing the electromagnetic waves;
   determining a speed of the electromagnetic waves propagating in said medium based on the duration and a thickness of the medium;
   determining a refractive index value based on the speed of the electromagnetic waves; and
   configuring a refractive index of the medium.

17. The method as claimed in claim 16, wherein said configuring a refractive index of the medium comprises:

selecting, using a laser selector device, a laser source for emitting a selected laser beam for input to said medium for programming the refractive index value of the medium to a value sufficient to store the electromagnetic waves inside the medium; and expanding, using a laser beam expander, the selected laser beam input to said medium, wherein said expanded selected laser beam is input to said medium in a direction transverse to a direction of said electromagnetic waves propagating inside said medium.

18. The method as claimed in claim 14, further comprising:

converting, using a convertor device connected to the conductor, electromagnetic waves exiting from the medium, to another energy type selected from the group comprising: electricity, heat, kinetic energy, and potential energy.

19. The method as claimed in claim 14, wherein the programming, using the modifier device, the refractive index value of the medium comprises:

running, using a programmed controller, an electromagnetically induced transparency model trained to model a relationship between a desired electromagnetic wave speed propagating within the medium in response to corresponding operating condition parameters of the medium and ambient environmental conditions inside said chamber.

20. The method as claimed in claim 19, wherein the ambient environmental conditions inside said chamber comprise one or more of: a temperature, a humidity, a pressure, and an air flow rate within the chamber.

* * * * *